United States Patent
Kacelenga

(10) Patent No.: US 11,487,332 B2
(45) Date of Patent: Nov. 1, 2022

(54) SYSTEMS AND METHODS FOR DETERMINING HINGE ANGLE POSITION IN AN INFORMATION HANDLING SYSTEM

(71) Applicant: Dell Products L.P., Round Rock, TX (US)

(72) Inventor: Ray V. Kacelenga, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 17/210,151

(22) Filed: Mar. 23, 2021

(65) Prior Publication Data

US 2022/0308639 A1 Sep. 29, 2022

(51) Int. Cl.
*G06F 1/16* (2006.01)
(52) U.S. Cl.
CPC .......... *G06F 1/1681* (2013.01); *G06F 1/1616* (2013.01); *G06F 1/1677* (2013.01)
(58) Field of Classification Search
CPC combination set(s) only.
See application file for complete search history.

(56) References Cited

U.S. PATENT DOCUMENTS

| 9,740,245 B2 * | 8/2017 | Gault ................. G06F 1/1615 |
| 9,785,196 B1 * | 10/2017 | Bowers .............. H04M 1/0249 |
| 10,331,175 B2 * | 6/2019 | Gault ................. G06F 1/1635 |
| 2015/0205331 A1 * | 7/2015 | McClintock .......... G06F 1/1618 |
| | | 361/679.09 |

* cited by examiner

*Primary Examiner* — Lisa Lea-Edmonds
(74) *Attorney, Agent, or Firm* — Jackson Walker L.L.P.

(57) ABSTRACT

A method for forming an information handling system may include mechanically coupling a first assembly to a second assembly via one or more hinges and mechanically coupling a plurality of rotational capacitors to one or both of the first assembly or the second assembly. Each particular rotational capacitor may include a fixed stator plate configured to remain fixed relative to the first assembly when the second assembly is rotated relative to the first assembly and a rotating rotor plate configured to rotate about an axis of the one or more hinges in synchronization with the second assembly when the second assembly is rotated relative to the first assembly, such that an overlap between the fixed stator plate and the rotating rotor plate varies as the second assembly is rotated relative to the first assembly, thus varying a capacitance of the particular rotational capacitor as the second assembly is rotated relative to the first assembly.

16 Claims, 6 Drawing Sheets

FIG. 1

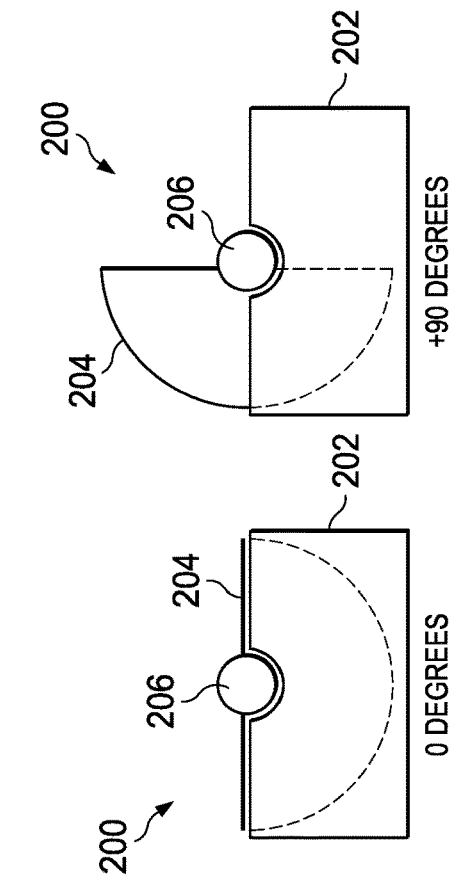
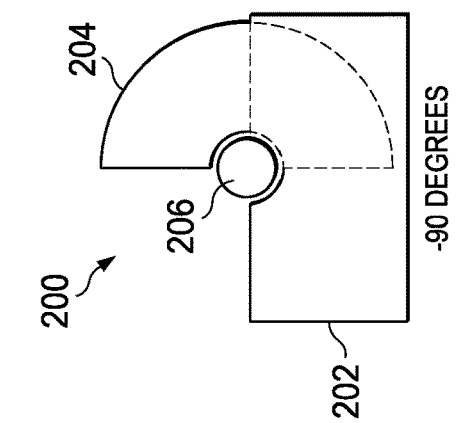
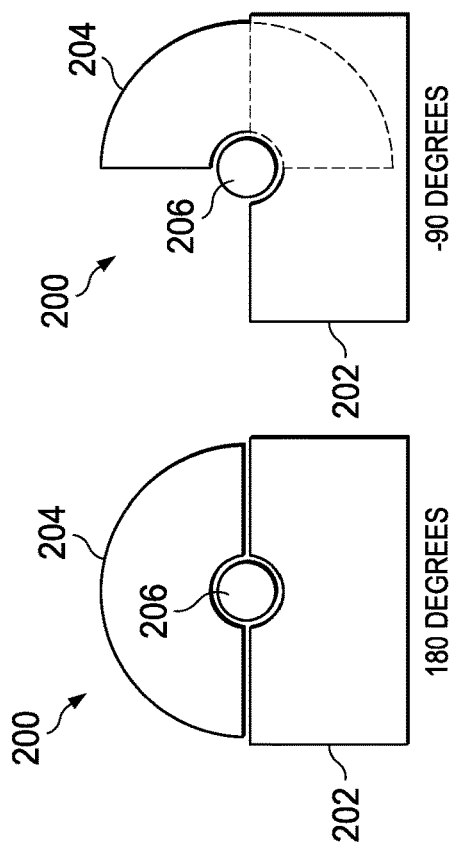
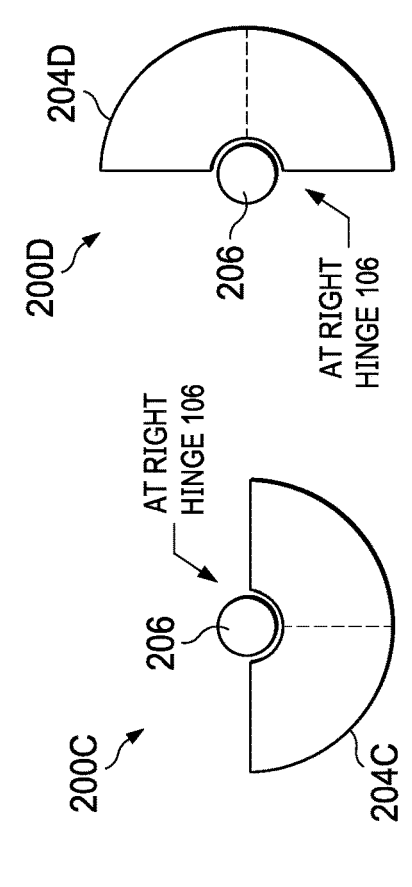
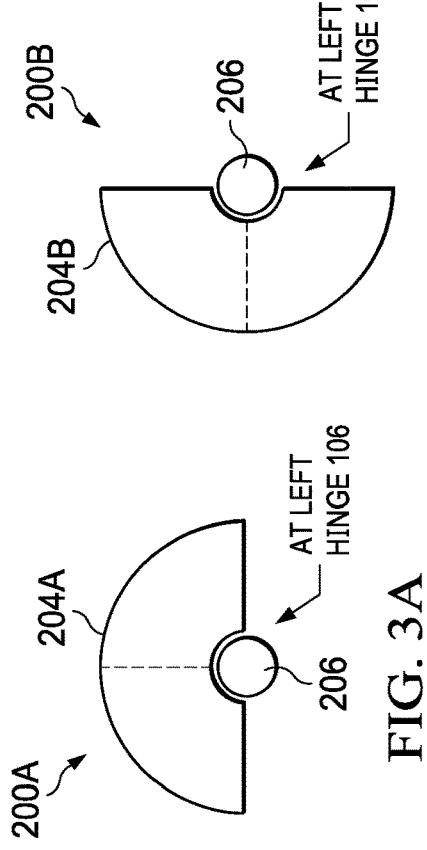

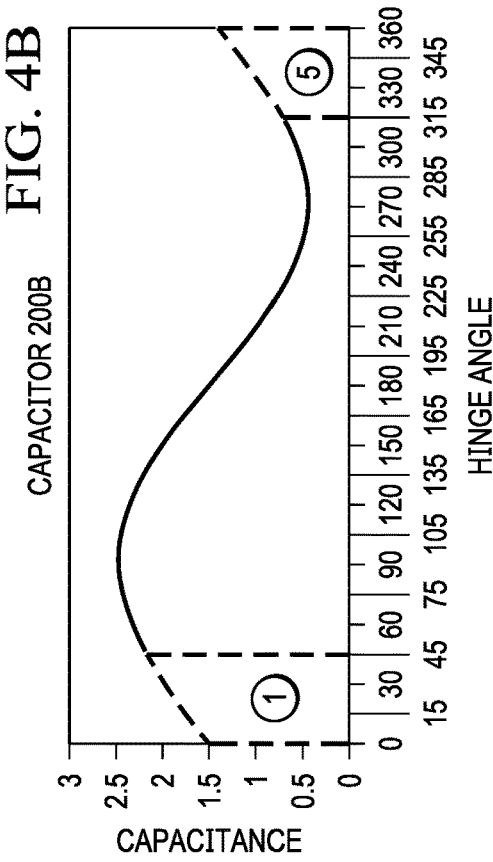
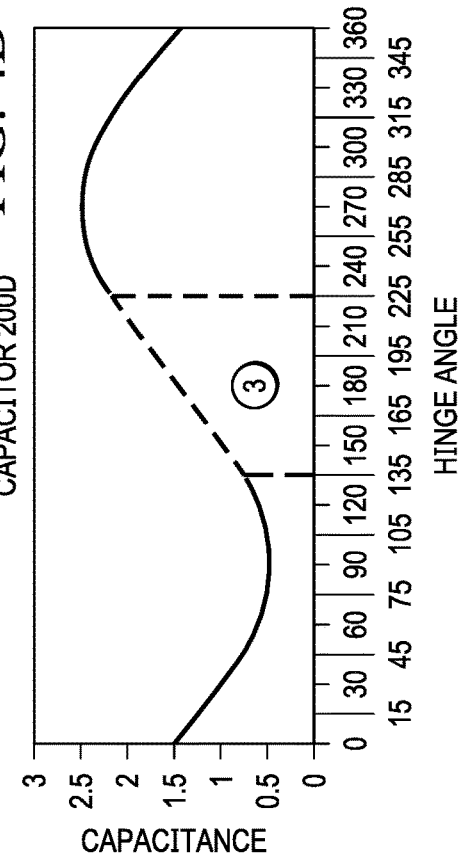
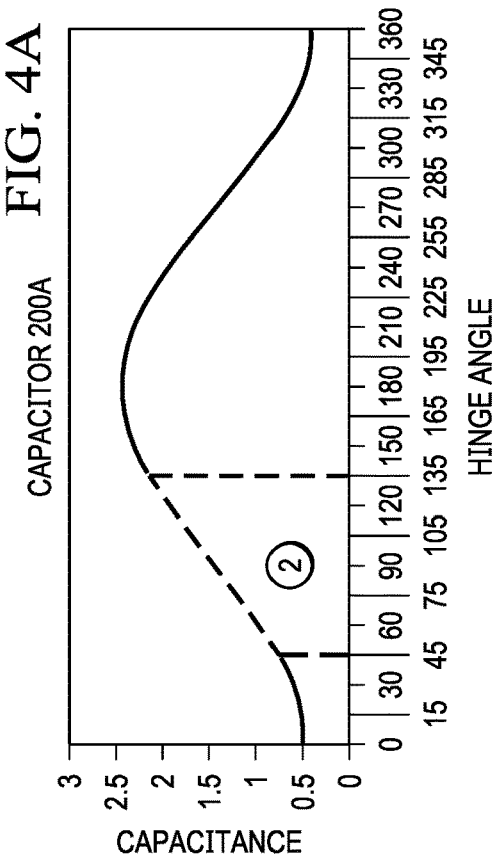
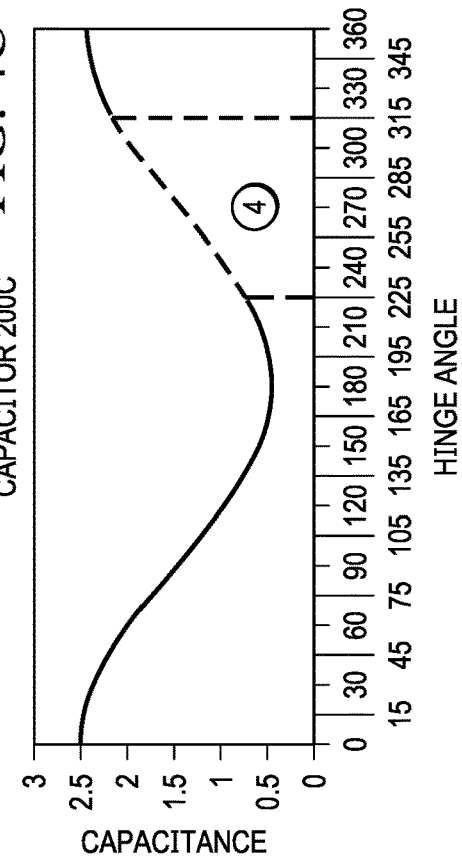

SYSTEMS AND METHODS FOR DETERMINING HINGE ANGLE POSITION IN AN INFORMATION HANDLING SYSTEM

TECHNICAL FIELD

The present disclosure relates in general to information handling systems, and more particularly to determining a hinge angle position in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Notebook computers (sometimes referred as laptop computers) have become increasingly popular for use in business and education. It is often desirable in notebook computers to detect an angle between a keyboard assembly and a display assembly rotatably coupled to one another via a hinge. Such information may be used to transition between power states of a notebook computer, as well as being used to indicate when certain components of an information handling system (e.g., camera, proximity sensors, etc.) are likely to be unused so that such components may be powered down. Traditionally, hinge angle detection is performed by the use of numerous inertial sensors, which may include accelerometers located in both the keyboard assembly and the display assembly, a gyroscope in the display assembly, and a magnetometer (e.g., an electronic compass) in the display assembly. The use of multiple inertial sensors to simply calculate an angular position of a notebook is often seen as quite costly. Accordingly, less costly systems and methods for detecting a hinge angle may be desired.

SUMMARY

In accordance with the teachings of the present disclosure, one or more disadvantages and problems associated with vertically-stacked information handling systems may be reduced or eliminated.

In accordance with embodiments of the present disclosure, an information handling system implemented as a notebook may include a first assembly, a second assembly coupled to the first assembly via one or more hinges, a plurality of rotational capacitors, and a hinge angle calculation module communicatively coupled to the plurality of rotational capacitors. Each particular rotational capacitor may include a fixed stator plate configured to remain fixed relative to the first assembly when the second assembly is rotated relative to the first assembly and a rotating rotor plate configured to rotate about an axis of the one or more hinges in synchronization with the second assembly when the second assembly is rotated relative to the first assembly, such that an overlap between the fixed stator plate and the rotating rotor plate varies as the second assembly is rotated relative to the first assembly, thus varying a capacitance of the particular rotational capacitor as the second assembly is rotated relative to the first assembly, and wherein the rotating rotor plates of the plurality of rotational capacitors are fixed relative to one another and each offset from each other by an angular displacement. The hinge angle calculation module may be configured to select a selected rotational capacitor from the plurality of rotational capacitors in order to maximize linearity of a relationship between capacitance of the selected rotational capacitor and a hinge angle of the second assembly relative to the first assembly and determine the hinge angle based on capacitance of the selected rotational capacitor.

In accordance with these and other embodiments of the present disclosure, a method may be for use in an information handling system implemented as a notebook, wherein the information handling system comprises a first assembly, a second assembly coupled to the first assembly via one or more hinges and a plurality of rotational capacitors, wherein each particular rotational capacitor comprises a fixed stator plate configured to remain fixed relative to the first assembly when the second assembly is rotated relative to the first assembly and a rotating rotor plate configured to rotate about an axis of the one or more hinges in synchronization with the second assembly when the second assembly is rotated relative to the first assembly, such that an overlap between the fixed stator plate and the rotating rotor plate varies as the second assembly is rotated relative to the first assembly, thus varying a capacitance of the particular rotational capacitor as the second assembly is rotated relative to the first assembly and wherein the rotating rotor plates of the plurality of rotational capacitors are fixed relative to one another and each offset from each other by an angular displacement. The method may include selecting a selected rotational capacitor from the plurality of rotational capacitors in order to maximize linearity of a relationship between capacitance of the selected rotational capacitor and a hinge angle of the second assembly relative to the first assembly and determining the hinge angle based on capacitance of the selected rotational capacitor.

In accordance with these and other embodiments of the present disclosure, a method for forming an information handling system, may include mechanically coupling a first assembly to a second assembly via one or more hinges and mechanically coupling a plurality of rotational capacitors to one or both of the first assembly or the second assembly. Each particular rotational capacitor may include a fixed stator plate configured to remain fixed relative to the first assembly when the second assembly is rotated relative to the first assembly and a rotating rotor plate configured to rotate about an axis of the one or more hinges in synchronization with the second assembly when the second assembly is rotated relative to the first assembly, such that an overlap between the fixed stator plate and the rotating rotor plate varies as the second assembly is rotated relative to the first assembly, thus varying a capacitance of the particular rotational capacitor as the second assembly is rotated relative to the first assembly. The rotating rotor plates of the plurality of rotational capacitors are fixed relative to one another and each offset from each other by an angular displacement.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 2A-2D illustrate an example rotational capacitor, in accordance with embodiments of the present disclosure;

FIGS. 3A-3D, collectively referred to herein as FIG. 3, illustrate relative positions of rotating rotor plates of rotational capacitors, in accordance with embodiments of the present disclosure;

FIG. 4A-4D illustrate examples of capacitance of rotational capacitors versus a hinge angle of an information handling system, in accordance with embodiments of the present disclosure;

DETAILED DESCRIPTION

Preferred embodiments and their advantages are best understood by reference to FIGS. 1 through 7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display.

The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
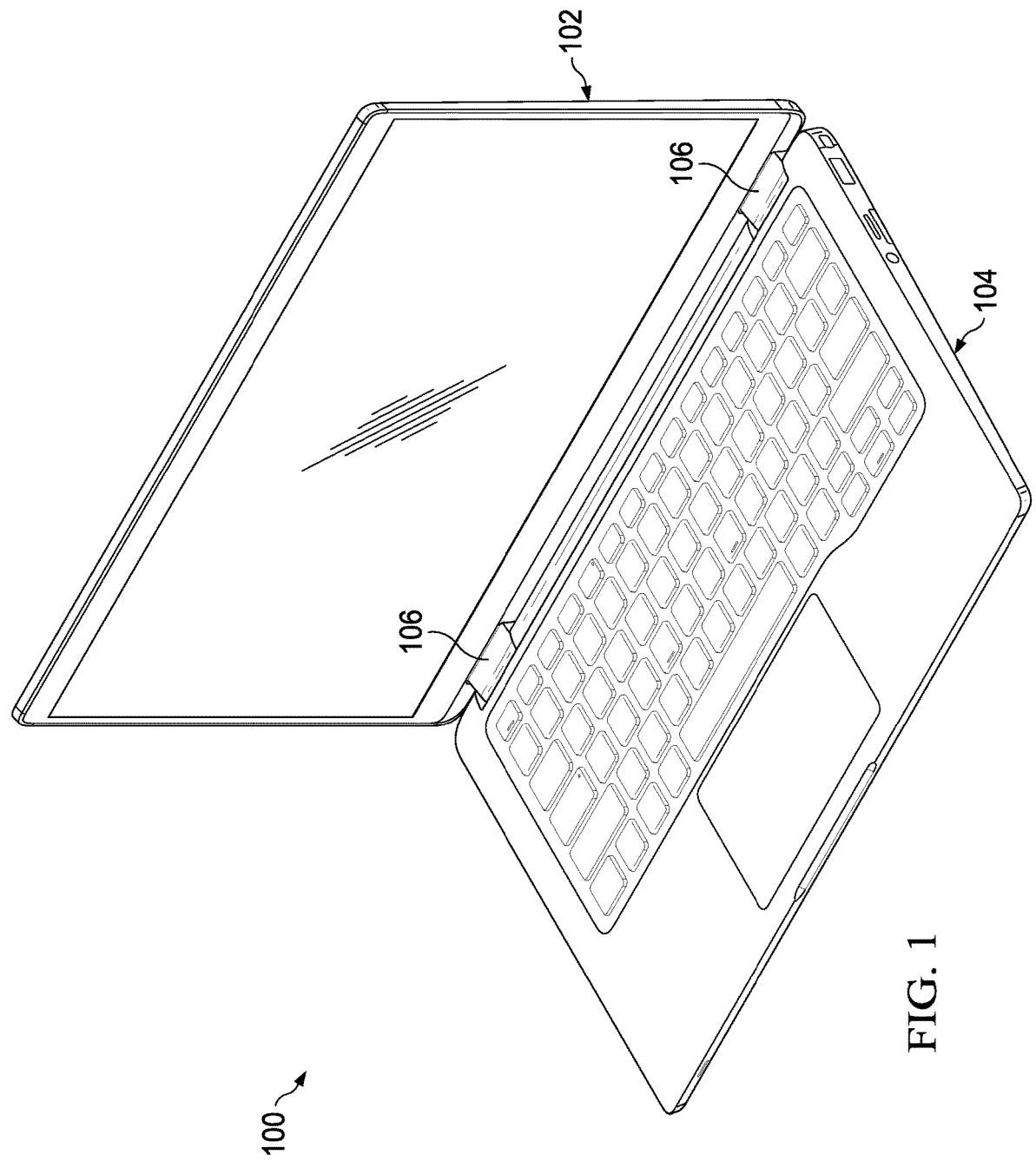
FIG. 1 illustrates an example notebook, in accordance with embodiments of the present disclosure.

FIG. 1 depicts an example convertible notebook 100, in accordance with embodiments of the present disclosure. As shown in FIG. 1, notebook 100 may include a display assembly 102 and a keyboard assembly 104 rotatably coupled to one another via one or more hinges 106.

FIGS. 2A-2D depict an example rotational capacitor 200, in accordance with embodiments of the present disclosure. As shown in FIGS. 2A-2D, rotational capacitor 200 may include a fixed stator plate 202 and rotating rotor plate 204 that rotates relative to fixed stator plate 202 about an axis 206 of rotation of a hinge 106. For example, in some embodiments, fixed stator plate 202 may remain fixed relative to keyboard assembly 104 and rotating rotor plate 204 may remain fixed relative to display assembly 102 such that as display assembly 102 rotates relative to keyboard assembly 104, rotating rotor plate 204 rotates relative to fixed stator plate 202. As another example, in some embodiments, fixed stator plate 202 may remain fixed relative to display assembly 102 and rotating rotor plate 204 may remain fixed relative to keyboard assembly 104 such that as display assembly 102 rotates relative to keyboard assembly 104, rotating rotor plate 204 that rotates relative to fixed stator plate 202.

As rotating rotor plate 204 rotates relative to fixed stator plate 202, a capacitance of rotational capacitor 200 may change. For example, when a rotational angle of rotating rotor plate 204 relative to fixed stator plate 202 is 180 degrees, as shown in FIG. 2A, capacitance of rotational capacitor 200 may be at its minimum. As another example, when a rotational angle of rotating rotor plate 204 relative to fixed stator plate 202 is 0 degrees, as shown in FIG. 2C, capacitance of rotational capacitor 200 may be at its maximum. As a further example, when a rotational angle of rotating rotor plate 204 relative to fixed stator plate 202 is 90 degrees (either positive 90 degrees or negative 90 degrees), as shown in FIGS. 2B and 2D, capacitance of rotational capacitor 200 may have an intermediate capacitance.

FIG. 3 illustrates relative positions of rotating rotor plates 204 of rotational capacitors 200, in accordance with embodiments of the present disclosure. For purposes of clarity, fixed stator plates 202 for each rotational capacitor 200 is not shown in FIG. 3. As shown in FIG. 3, information handling system 102 may include four rotational capacitors 200 (e.g., rotational capacitors 200A, 200B, 200C, and 200D) wherein rotating rotor plates 204 (e.g., rotating rotor plates 204A, 204B, 204C, and 204D) are angularly displaced at least 90 degrees relative to every other rotating rotor plate 204. For example, as shown in FIG. 3, when the hinge angle between keyboard assembly 104 and display assembly 102 is zero, rotating rotor plate 204A may be angularly displaced from its respective stator 202 by 180 degrees, rotating rotor plate 204B may be angularly displaced from its respective stator 202 by +90 degrees, rotating rotor plate 204C may be angularly displaced from its respective stator 202 by 0 degrees, and rotating rotor plate 204D may be angularly displaced from its respective stator 202 by −90 degrees.

FIGS. 4A-4D illustrate examples of capacitance of rotational capacitors 200 versus a hinge angle of an information handling system 102, in accordance with embodiments of the present disclosure. For example, FIG. 4A illustrates an example of capacitance of capacitor 200A versus the hinge angle between keyboard assembly 104 and display assembly 102, showing a region 2 in which the capacitance versus hinge angle relationship is approximately linear and monotonically increasing. As another example, FIG. 4B illustrates an example of capacitance of capacitor 200B versus the hinge angle between keyboard assembly 104 and display assembly 102, showing regions 1 and 5 in which the capacitance versus hinge angle relationship is approximately linear and monotonically increasing. As an additional example, FIG. 4C illustrates an example of capacitance of capacitor 200C versus the hinge angle between keyboard assembly 104 and display assembly 102, showing a region 4 in which the capacitance versus hinge angle relationship is approximately linear and monotonically increasing. As a further example, FIG. 4D illustrates an example of capacitance of capacitor 200D versus the hinge angle between keyboard assembly 104 and display assembly 102, showing a region 2 in which the capacitance versus hinge angle relationship is approximately linear and monotonically increasing.

Figure 5:
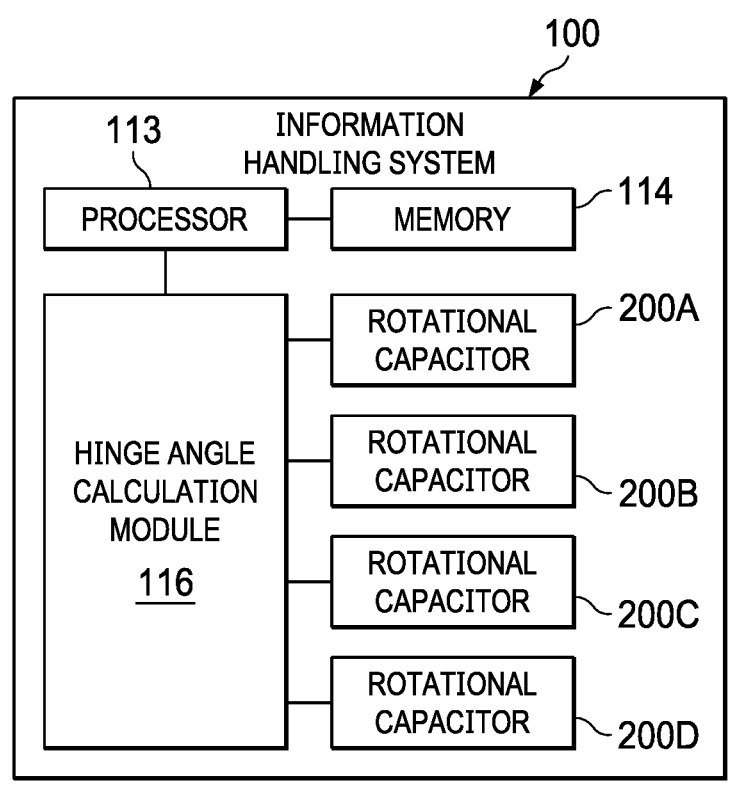
FIG. 5 illustrates a block diagram of selected components of an information handling system, in accordance with embodiments of the present disclosure.

FIG. 5 illustrates a block diagram of selected components of an information handling system 100, in accordance with embodiments of the present disclosure. As depicted in FIG. 1, information handling system 100 may include a processor 113, a memory 114 communicatively coupled to processor 113, a hinge angle calculation module 116 communicatively coupled to processor 113, and rotational capacitors 200A, 200B, 200C, and 200D communicatively coupled to hinge angle calculation module 116.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 100.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to information handling system 100 is turned off.

Hinge angle calculation module 116 may be communicatively coupled to processor 113, and may comprise any system, device, or apparatus configured to determine the capacitances of rotational capacitors 200 and based thereon, determine a hinge angle of display assembly 102 relative to keyboard assembly 104, as described in greater detail below.

In addition to processor 113, memory 114, hinge angle calculation module 116, and rotational capacitors 200, information handling system 100 may include one or more other information handling resources.

Figure 6:
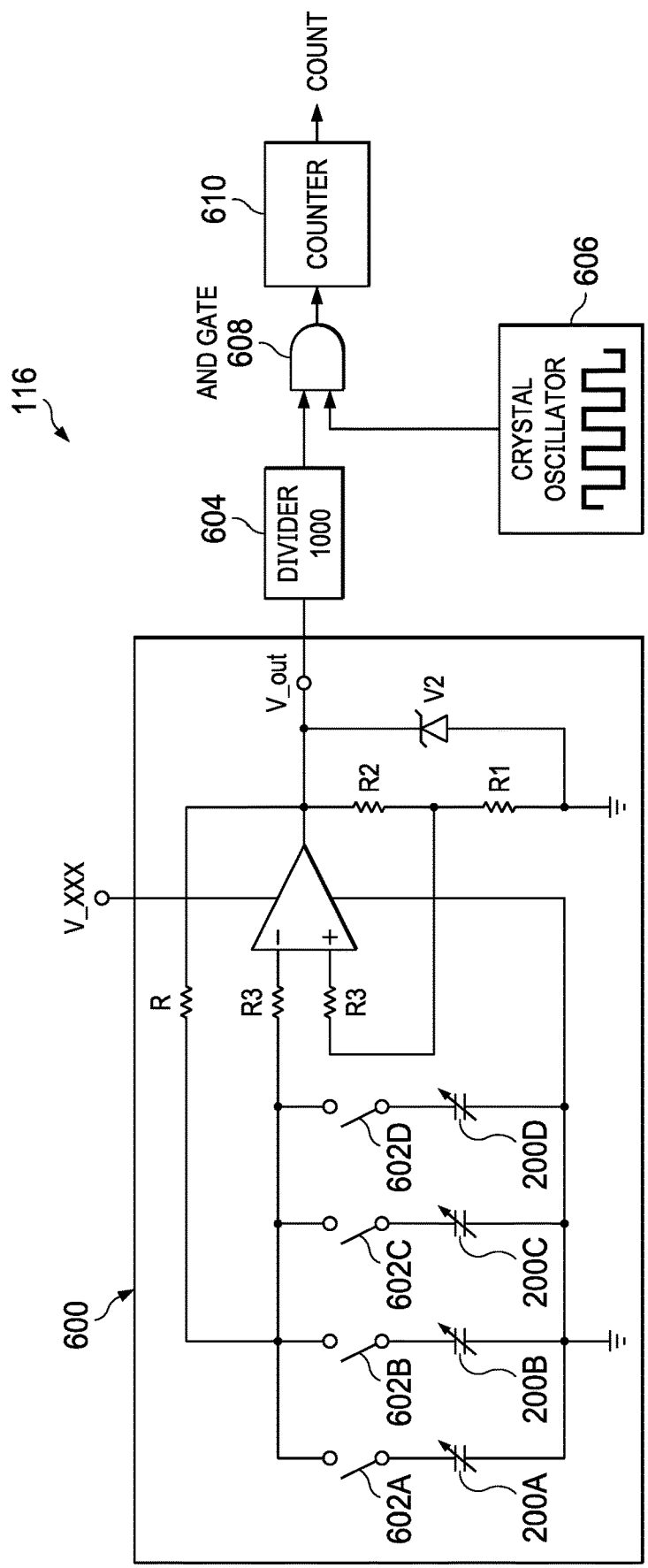
FIG. 6 illustrates a circuit diagram of selected components of a hinge angle calculation module, in accordance with embodiments of the present disclosure.

FIG. 6 illustrates a circuit diagram of selected components of hinge angle calculation module 116, in accordance with embodiments of the present disclosure. As shown in FIG. 6, hinge angle calculation module 116 may include a square wave oscillator 600, a frequency divider 604, a crystal oscillator 606, a logical AND gate 608, and a counter 610.

Square wave oscillator 600 may comprise any system, device, or apparatus configured to generate a square wave with a frequency that is a function of the capacitance of a rotational capacitor 200 which is selected and switched into square wave oscillator 600. For example, if a ratio β is defined as $\beta = R1/(R1+R2)$ where R1 and R2 are resistances of square wave oscillator 600 as shown in FIG. 6, and such resistances are selected such that $\beta = 0.462$ (e.g., such that $\ln[1+(2R1)/R2]=1$), then the frequency f of a square wave generated by square wave oscillator 600 may be given by $f=1/(2RC)$, wherein R is a resistance of square wave oscillator 600 as shown in FIG. 6.

As shown in FIG. 6, each of rotational capacitors 200 may be coupled in series to a corresponding switch 602, and although not shown in FIG. 6 for purposes of clarity and exposition, hinge angle calculation module 116 may include circuitry and/or a sub-module configured to control switching of switches 602 such that one of switches 602 is activated (e.g., turned on, enabled, closed) at a time while the other of switches 602 are deactivated (e.g., turned off, disabled, open), such that one of rotational capacitors 200 is electrically coupled to the remainder of square wave oscillator 600 at any given time, as described in greater detail below.

A divider 604 may convert the square wave signal V_out generated by square wave oscillator 600 into a similar square wave at a lower frequency (e.g., 1000 times lower), and logical AND gate 608 may logically AND such lower frequency square wave with a high-frequency (e.g., 5 MHz) square wave generated by a crystal oscillator 606, to generate a series of output pulses. Counter 610 may count the series of output pulses, and the counter value COUNT counted by counter 610 may be indicative of the hinge angle of display assembly 102 relative to keyboard assembly 104.

As mentioned above, hinge angle calculation module 116 may include circuitry and/or a sub-module configured to control switching of switches 602 such that one of rotational capacitors 200 is electrically coupled to the remainder of square wave oscillator 600 at any given time. In operation, at any given time hinge angle calculation module 116 may activate hinge angle calculation module 116 may activate a switch 602 associated with the rotating capacitor 200 that is, at such given time, in a position such that its capacitance-versus-angle relationship is in the linear region, as shown in FIGS. 4A-4D. Accordingly, such circuitry and/or a sub-module may select and enable a rotating capacitor 200 so as to maximize measurement linearity of hinge angle calculation module 116.

Set forth below is example pseudo-code that may be executed by hinge angle calculation module 116 to select an active rotational capacitors 200:

```
switch in capacitor 200A;
calculate angle_A - 45°;
if angle_A < 0°
{
   switch in capacitor 200D;
   calculate angle_D + 180°;
   if angle_D < 225°
      select Procedure D; //select cap 200D
   else
   {
      switch in capacitor 200C;
      calculate angle_C + 270°;
      if angle C < 315%
         select Procedure C; //select cap 200C
      else
      {
         switch in capacitor 200B;
         calculate angle_B;
         of angle_V < 0
            select procedure b;
            //select cap 200B
      }
   }
}
else
   select procedure A; //select cap 200A
```

Figure 7:
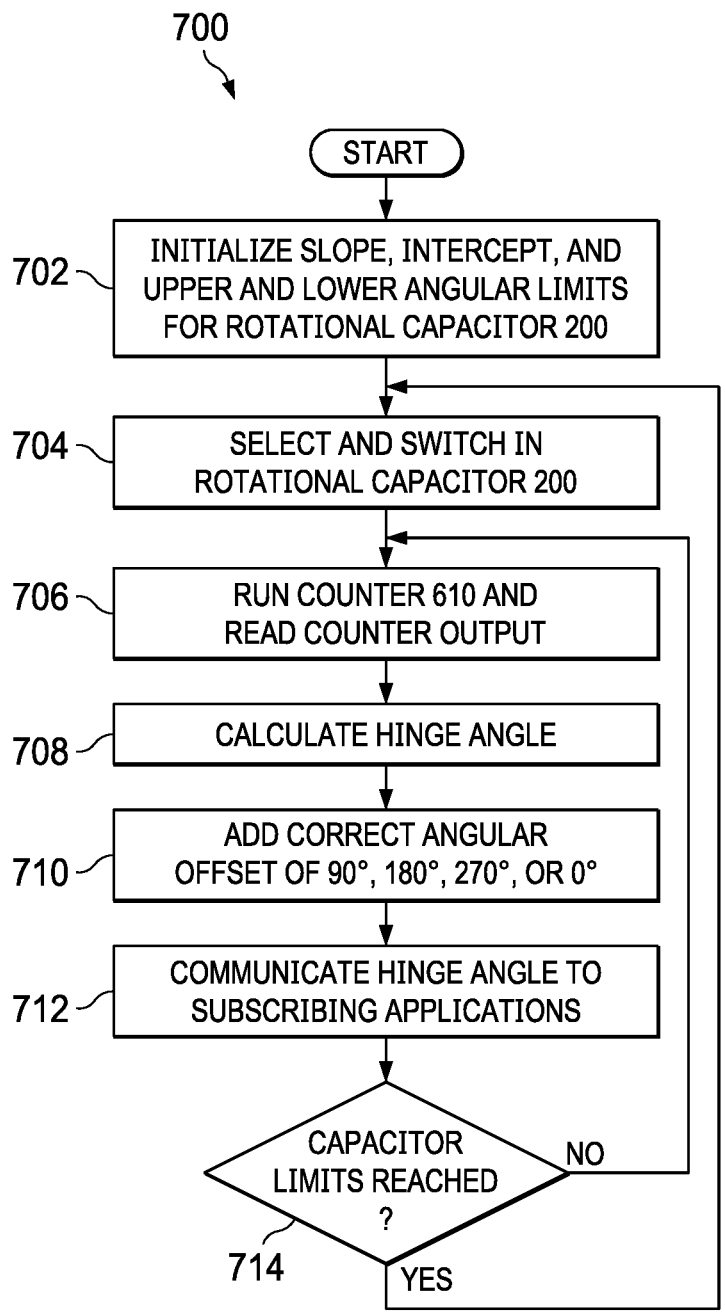
FIG. 7 illustrates a flow chart for an example method of determining a hinge angle, in accordance with embodiments of the present disclosure.

FIG. 7 illustrates a flow chart 700 for an example method of determining a hinge angle of display assembly 102 relative to keyboard assembly 104, in accordance with embodiments of the present disclosure. According to certain embodiments, method 700 may begin at step 702. As noted above, teachings of the present disclosure may be implemented in a variety of configurations of information handling system 100. As such, the preferred initialization point for method 700 and the order of the steps comprising method 700 may depend on the implementation chosen.

At step 702, hinge angle calculation module 116 may initialize parameters for rotational capacitors 200, for example a slope, an intercept, and upper and lower angular limits for each rotational capacitor 200, wherein the upper and lower angular limits for a rotational capacitor 200 defines the region of linearity and monotonicity of increase of capacitance versus hinge angle. At step 704, hinge angle calculation module 116 may select one of rotational capacitors 200 to be active in order to maximize measurement linearity, and switch such selected rotational capacitor 200 into square wave oscillator 600.

At step 706, hinge angle calculation module 116 may execute counter 610 to generate counter output value COUNT. At step 708, hinge angle calculation module 116 may calculate a hinge angle based on counter output value COUNT, including correcting for an angular offset of the selected rotational capacitor 200 relative to the other rotational capacitors 200 at step 710. At step 712, hinge angle calculation module 116 may communicate the hinge angle to any applications executing on information handling system 100 that may use the determination of the hinge angle.

At step 714, hinge angle calculation module 116 may determine if the upper angular limit or lower angular limit of linear operation for the selected rotational capacitor 200 has been reached. If the upper angular limit or lower angular limit of linear operation for the selected rotational capacitor 200 has been reached, method 700 may proceed again to step 704. Otherwise, method 700 may proceed again to step 706.

Although FIG. 7 discloses a particular number of steps to be taken with respect to method 700, it may be executed with greater or fewer steps than those depicted in FIG. 7. In addition, although FIG. 7 discloses a certain order of steps to be taken with respect to method 700, the steps comprising method 700 may be completed in any suitable order.

Method 700 may be implemented using information handling system 100, components thereof or any other system operable to implement method 700. In certain embodiments, method 700 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system implemented as a notebook, comprising:
    a first assembly;
    a second assembly coupled to the first assembly via one or more hinges;
    a plurality of rotational capacitors, each particular rotational capacitor comprising:
        a fixed stator plate configured to remain fixed relative to the first assembly when the second assembly is rotated relative to the first assembly; and
        a rotating rotor plate configured to rotate about an axis of the one or more hinges in synchronization with the second assembly when the second assembly is rotated relative to the first assembly, such that an overlap between the fixed stator plate and the rotating rotor plate varies as the second assembly is rotated relative to the first assembly, thus varying a capacitance of the particular rotational capacitor as the second assembly is rotated relative to the first assembly;
        wherein the rotating rotor plates of the plurality of rotational capacitors are fixed relative to one another and each offset from each other by an angular displacement; and
    a hinge angle calculation module communicatively coupled to the plurality of rotational capacitors and configured to:
        select a selected rotational capacitor from the plurality of rotational capacitors in order to maximize linearity of a relationship between capacitance of the selected rotational capacitor and a hinge angle of the second assembly relative to the first assembly; and
        determine the hinge angle based on capacitance of the selected rotational capacitor.

2. The information handling system of claim 1, wherein:
    the first assembly comprises a keyboard assembly comprising a keyboard; and
    the second assembly comprises a display assembly comprising a display device.

3. The information handling system of claim 1, wherein the plurality of rotational capacitors comprises four rotational capacitors comprising:
    a first rotational capacitor;
    a second rotational capacitor, wherein the rotating rotor plate of the second rotational capacitor has a fixed angular displacement of 90 degrees from the rotating rotor plate of the first rotational capacitor;
    a third rotational capacitor, wherein the rotating rotor plate of the third rotational capacitor has a fixed angular displacement of 180 degrees from the rotating rotor plate of the first rotational capacitor; and
    a fourth rotational capacitor, wherein the rotating rotor plate of the fourth rotational capacitor has a fixed angular displacement of 270 degrees from the rotating rotor plate of the first rotational capacitor.

4. The information handling system of claim 1, wherein the hinge angle calculation module:
    further comprises a waveform oscillator configured to generate a periodic signal having a frequency based on the capacitance of the selected rotational capacitor; and
    is further configured to determine the hinge angle based on the frequency.

5. The information handling system of claim 4, wherein the periodic signal is a square wave.

6. A method, for use in an information handling system implemented as a notebook, wherein the information handling system comprises a first assembly, a second assembly coupled to the first assembly via one or more hinges and a plurality of rotational capacitors, wherein each particular rotational capacitor comprises a fixed stator plate configured to remain fixed relative to the first assembly when the second assembly is rotated relative to the first assembly and a rotating rotor plate configured to rotate about an axis of the one or more hinges in synchronization with the second assembly when the second assembly is rotated relative to the first assembly, such that an overlap between the fixed stator plate and the rotating rotor plate varies as the second assembly is rotated relative to the first assembly, thus varying a capacitance of the particular rotational capacitor as the second assembly is rotated relative to the first assembly and wherein the rotating rotor plates of the plurality of rotational capacitors are fixed relative to one another and each offset from each other by an angular displacement, wherein the method comprises:
    selecting a selected rotational capacitor from the plurality of rotational capacitors in order to maximize linearity of a relationship between capacitance of the selected rotational capacitor and a hinge angle of the second assembly relative to the first assembly; and
    determining the hinge angle based on capacitance of the selected rotational capacitor.

7. The method of claim 6, wherein:
    the first assembly comprises a keyboard assembly comprising a keyboard; and
    the second assembly comprises a display assembly comprising a display device.

8. The method of claim 6, wherein the plurality of rotational capacitors comprises four rotational capacitors comprising:
    a first rotational capacitor;
    a second rotational capacitor, wherein the rotating rotor plate of the second rotational capacitor has a fixed angular displacement of 90 degrees from the rotating rotor plate of the first rotational capacitor;
    a third rotational capacitor, wherein the rotating rotor plate of the third rotational capacitor has a fixed angular displacement of 180 degrees from the rotating rotor plate of the first rotational capacitor; and
    a fourth rotational capacitor, wherein the rotating rotor plate of the fourth rotational capacitor has a fixed angular displacement of 270 degrees from the rotating rotor plate of the first rotational capacitor.

9. The method of claim 6, further comprising:
    generating a periodic signal having a frequency based on the capacitance of the selected rotational capacitor; and
    determining the hinge angle based on the frequency.

10. The method of claim 9, wherein the periodic signal is a square wave.

11. A method for forming an information handling system, comprising:
    mechanically coupling a first assembly to a second assembly via one or more hinges; and mechanically coupling a plurality of rotational capacitors to one or both of the first assembly or the second assembly, each particular rotational capacitor comprising:
- a fixed stator plate configured to remain fixed relative to the first assembly when the second assembly is rotated relative to the first assembly; and
- a rotating rotor plate configured to rotate about an axis of the one or more hinges in synchronization with the second assembly when the second assembly is rotated relative to the first assembly, such that an overlap between the fixed stator plate and the rotating rotor plate varies as the second assembly is rotated relative to the first assembly, thus varying a capacitance of the particular rotational capacitor as the second assembly is rotated relative to the first assembly;
- wherein the rotating rotor plates of the plurality of rotational capacitors are fixed relative to one another and each offset from each other by an angular displacement.

12. The method of claim 11, further comprising communicatively coupling a hinge angle calculation module to to the plurality of rotational capacitors, the hinge angle calculation module configured to:
- select a selected rotational capacitor from the plurality of rotational capacitors in order to maximize linearity of a relationship between capacitance of the selected rotational capacitor and a hinge angle of the second assembly relative to the first assembly; and
- determine the hinge angle based on capacitance of the selected rotational capacitor.

13. The method of claim 12, wherein the hinge angle calculation module:
- further comprises a waveform oscillator configured to generate a periodic signal having a frequency based on the capacitance of the selected rotational capacitor; and
- is further configured to determine the hinge angle based on the frequency.

14. The method of claim 13, wherein the periodic signal is a square wave.

15. The method of claim 11, wherein:
- the first assembly comprises a keyboard assembly comprising a keyboard; and
- the second assembly comprises a display assembly comprising a display device.

16. The method of claim 11, wherein the plurality of rotational capacitors comprises four rotational capacitors comprising:
- a first rotational capacitor;
- a second rotational capacitor, wherein the rotating rotor plate of the second rotational capacitor has a fixed angular displacement of 90 degrees from the rotating rotor plate of the first rotational capacitor;
- a third rotational capacitor, wherein the rotating rotor plate of the third rotational capacitor has a fixed angular displacement of 180 degrees from the rotating rotor plate of the first rotational capacitor; and
- a fourth rotational capacitor, wherein the rotating rotor plate of the fourth rotational capacitor has a fixed angular displacement of 270 degrees from the rotating rotor plate of the first rotational capacitor.

* * * * *